(12) United States Patent
Lick et al.

(10) Patent No.: US 7,374,321 B2
(45) Date of Patent: May 20, 2008

(54) DEVICE AND METHOD FOR DISPLAYING LUMINOUS RADIATION ON AN AIRCRAFT

(76) Inventors: Jürgen Lick, Glatistrasse 12, München (DE) 81641; Veronika Schedlbauer, Mussinanstrasse 9d, Bogen (DE) 94327

( * ) Notice: Subject to any disclaimer, the term of this patent is extended or adjusted under 35 U.S.C. 154(b) by 186 days.

(21) Appl. No.: 10/501,180

(22) PCT Filed: Jan. 10, 2003

(86) PCT No.: PCT/EP03/00187

§ 371 (c)(1),
(2), (4) Date: May 2, 2005

(87) PCT Pub. No.: WO03/058586

PCT Pub. Date: Jul. 17, 2003

(65) Prior Publication Data

US 2005/0219257 A1    Oct. 6, 2005

(30) Foreign Application Priority Data

Jan. 11, 2002    (DE) .......................... 202 00 396 U

(51) Int. Cl.
*F21V 21/00*    (2006.01)

(52) U.S. Cl. ...................... 362/471; 362/553; 362/470

(58) Field of Classification Search ................ 362/470, 362/553, 551, 471, 511, 558, 559, 311, 472, 362/259; 244/30, 31
See application file for complete search history.

(56) References Cited

FOREIGN PATENT DOCUMENTS

| EP | 0 857 647 A1 | * | 8/1998 |
| EP | 0857647 A1 | | 8/1998 |
| GB | 2265592 A | | 10/1993 |
| WO | WO 99/54863 | * | 10/1999 |
| WO | WO-9954863 A1 | | 10/1999 |

* cited by examiner

*Primary Examiner*—Bao Q Truong
(74) *Attorney, Agent, or Firm*—IP Strategies

(57) ABSTRACT

The invention relates to a device and method for displaying luminous radiation on a shell of an aircraft, comprising at least one light source for producing luminous radiation, and at least one projection device for converting the luminous radiation into projectable luminous radiation. The at least one projection device is mounted inside the shell in order to project the luminous radiation through the interior (15) and onto the shell (60). Said shell is translucent at least in portions thereof whereby making the projected luminous radiation visible from the outside. The invention also relates to a method for displaying luminous radiation on a shell of an aircraft.

28 Claims, 3 Drawing Sheets

DEVICE AND METHOD FOR DISPLAYING LUMINOUS RADIATION ON AN AIRCRAFT

The invention relates to an apparatus and a method for displaying luminous radiation on a shell of an aircraft, and from an aircraft in a selectable direction, respectively, as well as to an aircraft which is equipped with one of several of such apparatuses. The aircraft is in particular an airship.

The present invention is based on the object to provide an apparatus and a method, respectively, for using aircrafts, in particular airships, for displaying visible, color and animated information.

This object is solved by the apparatuses according to the independent methods. Advantageous embodiments are defined in the dependent claims.

According to the invention, there is provided an apparatus for displaying luminous radiation on a shell of an aircraft, comprising at least one light source for producing luminous radiation;

at least one projection device for converting the luminous radiation into projectable luminous radiation;

wherein at least one projection device is arranged in the interior of the shell, for projecting the luminous radiation through the interior (15) onto the shell (60), and the shell is translucent at least in portions, for making the projected luminous radiation visible from the outside.

Due to the arrangement of the at least one projection device within the interior of the aircraft, the aircraft remains compact. Thus, the projection devices do not generate an additional aerodynamic resistance—contrary to externally arranged projection devices.

If the light source(s) are arranged outside the shell, in particular in a loading area of the aircraft, they are easily accessible—e.g. for maintenance. Then, the generated light is guided advantageously via at least one light wave guide along the shell to the at least one projection device.

According to an advantageous embodiment, at least one lead-through is provided at the shell of the aircraft for arranging at least one turret, which is translucent and sealed against the interior of the shell.

According to an advantageous embodiment, the at least one projection device is exchangeably arranged in the at least on turret.

The invention relates also to an apparatus for displaying luminous radiation from an aircraft, comprising at least one light source for producing luminous radiation;

at least one projection device for converting the luminous radiation into projectable luminous radiation;

wherein the projection device 51 is adapted for projecting luminous radiation in arbitrarily definable directions.

This embodiment is suitable for projecting luminous radiation onto arbitrary areas on the earth's surface, on buildings, etc.

Particularly advantageous according to all embodiments of the invention is if the aircraft is an airship. Then the projection surface is just the shell of the aircraft, which comprises the buoyant gas.

Advantageously, the at least one light source is a laser light source.

Advantageously, at least one light wave guide may be provided for guiding the luminous radiation from the at least one light source to the at least one projection device.

If at least one projection device is adapted for projecting image carrying luminous radiation or for projecting effect light, particularly pleasing graphics may be projected.

The at least one projection device may be adapted for projecting spatial and/or time varying luminous radiation and/or moving pictures.

Image carrying luminous radiation may be composed of several partial images and/or projected by several projection devices.

Further, at least one light source may be housed in at least one projection device.

Further provided is that the at least one projection device is adapted for projecting image carrying luminous radiation which is simultaneous with external events.

The invention comprises also an aircraft, in particular an airship, with at least one apparatus according to one of the preceding claims.

According to an aspect of the invention, the apparatus comprises one or several projection devices which project image carrying luminous radiation, e.g. laser light and/or spot light, through the interior onto the translucent shell of the aircraft, and thus make them visible from the outside, as well as projection devices which project luminous radiation, e.g. laser light, out from the aircraft to natural and/or artificial projection areas which are located on the earth's surface or in the air. The projection surfaces may also be curved or uneven. They may also be walls of buildings, etc.

Hereby, the actual light power for the projection device(s) for image carrying luminous radiation, e.g. laser light, is produced by at least one central light source which is carried by the airship, external to the shell of the airship, as load in the nacelle, cabin, cargo room, etc., and is guided by light wave guides and control signal lines for the light radiation deviation and spot light control on the outside shell.

The projection devices may be housed in translucent turrets. The translucent turrets internally are sealed against the interior of the buoyant gas filled airship shell. The number and locations are dependent on form and size of the airship, and influence, due to the radiation angle of the projection devices, the space, the number and the size of the projections on the shell of the airship.

Advantageously, light source and projection devices may be located spatially separated from each other. The separation of the light source from the projection devices breaks with the predominant teaching, to arrange technical equipment, light source and projection device as one unit in the interior of the airship shell, in order to achieve a favorable illumination angle on the shell of the airship. With this measure, the disadvantages are removed which result from the considerably reduced accessibility of the interior of the airship shell.

With a weight of the light source, e.g. a laser light source, of approx. 200 kilograms and a weight of the projection device of 3 kilograms (according to the state of the art), the weight of the technical equipment or the instrumentation is considerably reduced due to the centralization of the laser light source. For the implementation of the invention, this is a particularly interesting aspect.

Moreover, with the apparatuses according to the invention embodying several projection devices, there is no adverse effect of the projections from other locations to the locations of the airship from the leading through of the luminous power, on which the projection devices are arranged, whereby a maximum effective projection surface is achieved.

According to the invention, there is a high safety against disturbance of the information transmission via light wave guide and control signal lines for the luminous radiation deviation on the outside of the shell, in contrast to the radio frequency control, e.g.

In a further aspect of the invention, the projection of luminous radiation is done as image carrying luminous radiation or non-image carrying luminous radiation, e.g. laser light, from the load area, the nacelle, cabin, cargo room, etc. by means of projection device(s), onto natural and/or artificial projection areas which are on the earth's surface or in the air, and other areas. Thus, marking tasks, for example for search actions, mine fields, dangerous areas, operation areas, etc. may be performed in larger areas without any danger, or, and leading tasks supervisable for ground troops/personal, furthermore, the attention of the visitor enhanced, and the traceability of information on the sky may be facilitated.

Furthermore, the projection of spot light enhanced with moving and color effects may be performed in identical turrets. The principle of projection and the arrangement of the computer-controlled effect light sources is the same as with projection devices for image carrying luminous radiation. This projection of the effect light should be a frame for the information projections of the airship shell and should come along with it for enhancing the attention and the interest of the spectator.

The combination of image carrying luminous radiation and effect light is thus using almost the whole airship shell as projection surface for displaying the intended color and animated information.

Thus, according to the invention, there is an arrangement and apparatus for displaying and projecting of visual, static, moving, colored and animated information through the aircraft body onto the aircraft shell and from the aircraft onto arbitrary projection surfaces and/or uneven surfaces for the seed of information, art, and advertising.

The invention comprises also a method for displaying luminous radiation on the shell of an aircraft, wherein
  luminous radiation is produced by at least one light source;
  luminous radiation is converted by at least one projection device into projectable luminous radiation;
  whereby
  the luminous radiation is projected through the interior of the shell onto the shell; and
  the projected luminous radiation is made visible through an at least partially translucent shell from the outside.

Furthermore, the invention comprises a method for displaying luminous radiation on the shell of an aircraft, comprising the following steps:
  producing luminous radiation with at least one light source;
  converting the luminous radiation into projectable luminous radiation;
  projecting luminous radiation in arbitrarily definable directions.

Advantageously, the information may comprise fast changing and/or moving pictures, and may be accessible to one, several or many spectators.

The invention is further described in connection with the drawings, wherein

Figure 1:
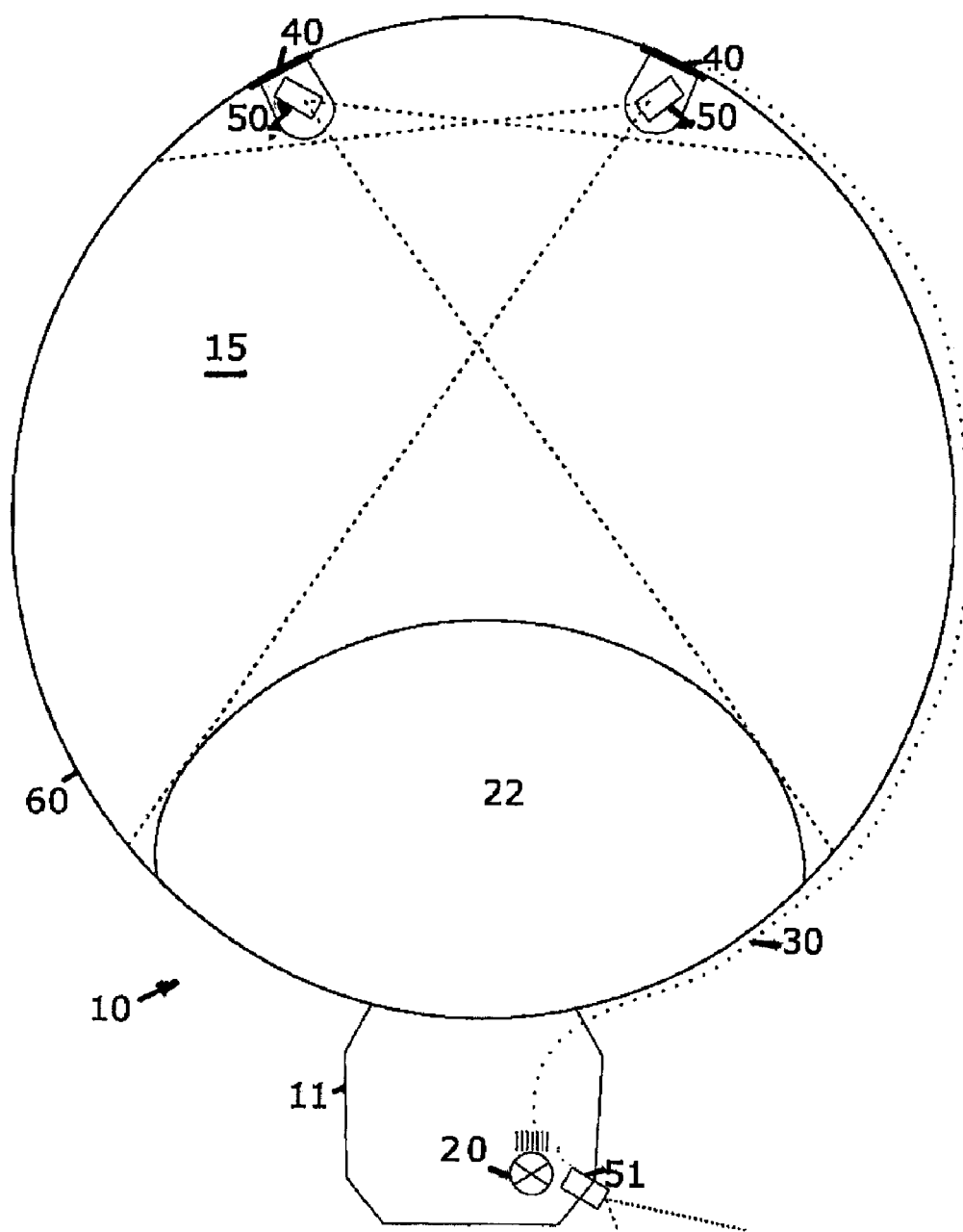
FIG. 1 illustrates a cross section of an aircraft comprising an apparatus according to a preferred embodiment of the present invention.

FIG. 1 illustrates a cross section of an aircraft 10 with a nacelle 11, ballonet 22 and shell 60. A light source 20 is arranged in a nacelle 11 of the airship 10. The light source 20 is in particular a laser light source. By means of light wave guides 30, the light produced by the light source 20 is guided along the shell 60 of the airship to the projection devices 50. The projection devices 50 are arranged in the interior of the shell 60. The light wave guides 30 are let through at lead-through 40 through the shell 60. The projection devices 50 project the luminous radiation against the airship shell 60, which is translucent. Together with the light guide 30, there may be laid out lines for controlling the projection devices.

Furthermore, there is a projection device 51 located on the nacelle, which radiates from the airship away. This projection device is also connected via a light guide 30 with the light source 20.

Advantageously, the airship 10 is a blimp. Then, there are no stakes which are usual with rigid airships in the interior 15 of the shell 60, which may hinder the light way of the projections. For achieving a maximum possible projection surface on a shell 60 of the airship it is important that the ballonet 22 in the interior of the shell 60 is as small as possible. Particularly advantageous if the ballonet is located in the center of the shell 60.

Figure 2:
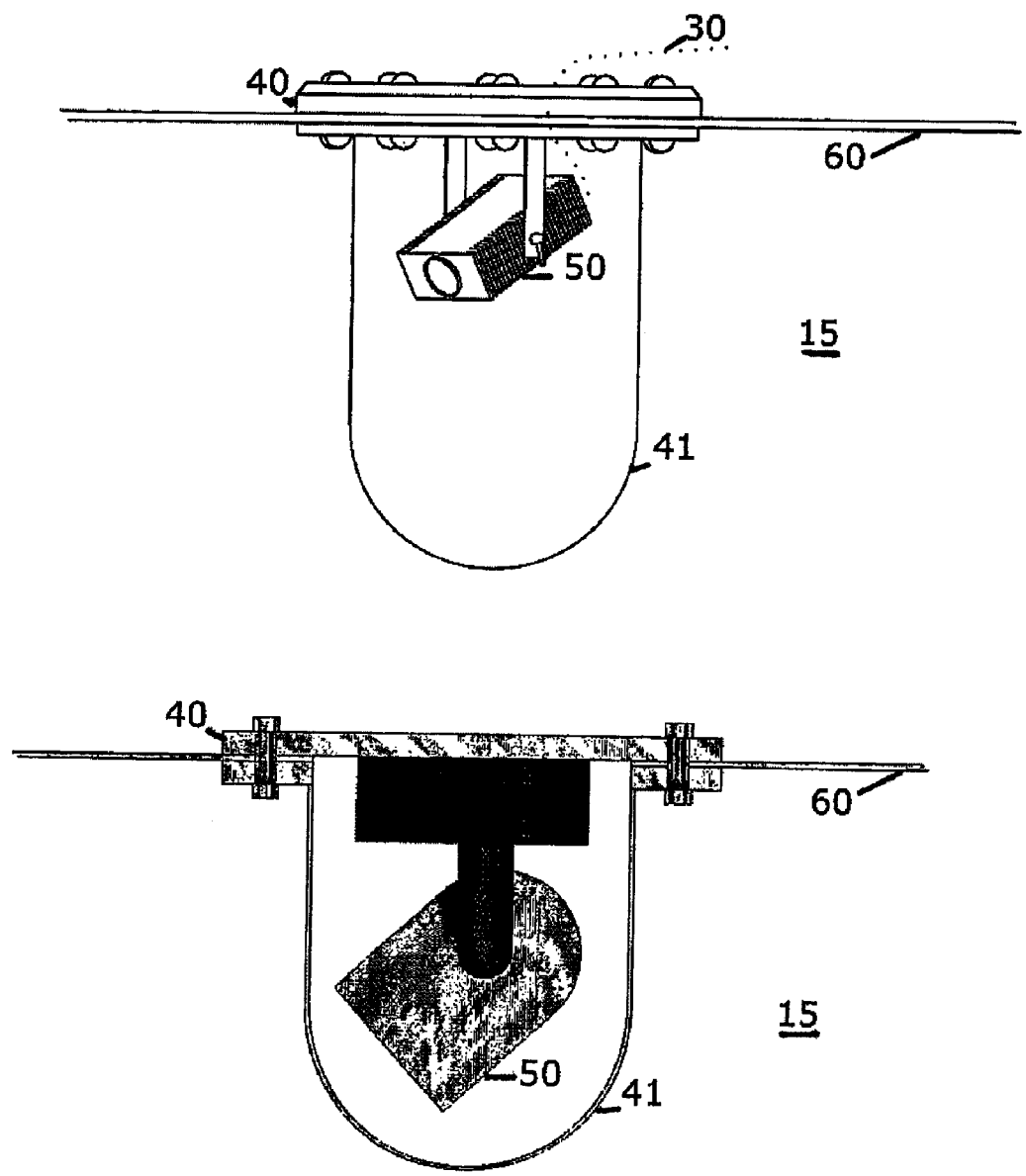
FIG. 2 illustrates perspectives of projection devices according to the inventive apparatus.

FIG. 2 illustrates in detail perspectives of projection devices of the apparatus according to the invention. The projection devices 50 are located behind translucent turrets 41 in the interior 15 of the shell 60. The light/control lines 30 are guided at the lead-through 40 to the projection devices 50.

Figure 3:
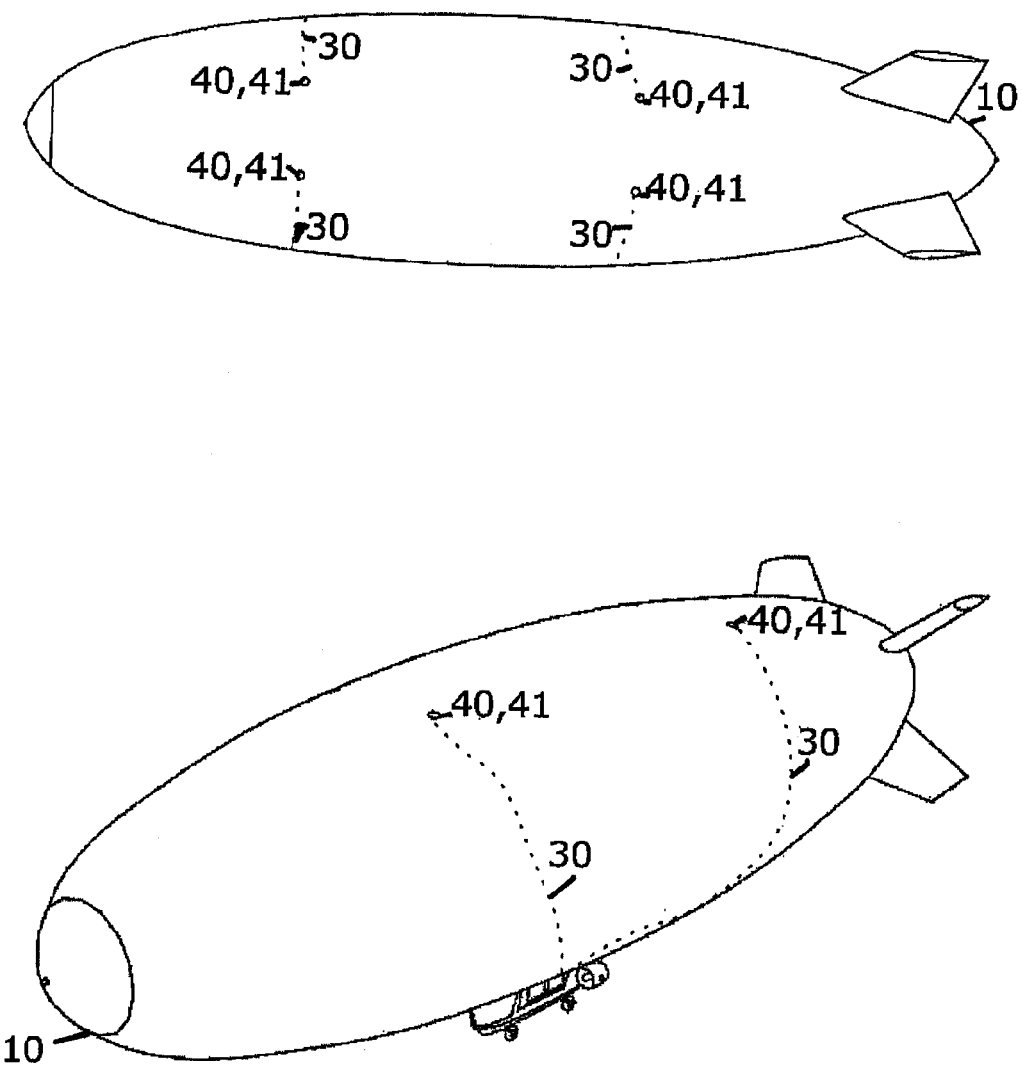
FIG. 3 illustrates a plan view onto and a perspective of a possible arrangement of the translucent turrets for housing the projection devices according to one preferred embodiment of the present invention.

FIG. 3 illustrates a view on and a perspective of a possible arrangement of translucent turrets 41 for housing the projection devices 50 of the preferred embodiment of the present invention.

A preferred embodiment of the invention relates to an apparatus for displaying visible information on the shell of an aircraft 10, in particular of an airship, comprising the following elements:
  a) at least one light source 20 outside the shell 15 or in the cargo area of the aircraft 11 for producing luminous radiation and image carrying luminous radiation;
  b) at least one light guide 30 for guiding the luminous radiation to the respective projection devices;
  c) at least one lead-through 40 on the shell of the aircraft, for arranging the translucent turrets 41 being sealed against the interior 15 of the shell of the aircraft;
  d) at least one projection device 50 for producing image carrying luminous radiation by at least one imaging method from the guided information, which comprises light as well as electrical/electronic signals;
  e) a translucent shell 60 or a plurality of translucent shell portions for displaying the image carrying luminous radiation and light effects thereon by means of projection through the interior of the aircraft 10.

In a further aspect of this apparatus, the projection device is used with laser light.

In a further aspect of this apparatus, the projection device is used with effect light sources.

In a further aspect of this apparatus, the imaging methods produce spatial and/or time variant laser light radiation.

In a further aspect of this apparatus, imaging methods produce luminous radiation for projecting moving pictures.

In a further aspect of this apparatus, the image carrying luminous radiation is built together from several partial images and/or produced by several projection devices.

In a further aspect of this apparatus, the light source 20 is housed with or without light guide in the projection device 50.

In a further aspect of this apparatus, the projection device 50 is exchangeably arranged in the lead-through 40.

In a further aspect of this apparatus, the projection device 50 produces image carrying luminous radiation which is simultaneous with external events.

In a further embodiment, at least one projection device 51 produces laser light from the nacelle, cabin, cockpit, working rooms or cargo rooms of the aircraft 11 in one or several arbitrary directions.

In a further embodiment, at least one projection device 51 produces the imaging methods, projections of moving pictures from the nacelle, cabin, cockpit, lavatories, working rooms, or cargo rooms of the aircraft 11 in one or several arbitrary directions.

The invention claimed is:

1. An apparatus for displaying luminous radiation on a shell of an aircraft, comprising:
    at least one light source that produces luminous radiation;
    at least one projection device, arranged within the interior of the shell, that converts the luminous radiation into projectable luminous radiation and projects the projectable luminous radiation across the interior of the shell; and
    at least one translucent turret sealed against the interior of the shell at a respective at least one fixed location;
    wherein each said at least one projection device is arranged within a respective one of said at least one translucent turret;
    wherein the shell is translucent at least in portions, such that the projected luminous radiation is visible from the outside the shell;
    wherein the shell includes at least one lead-through, wherein each said at least one lead-through is disposed at a respective one of the at least one fixed location; and
    wherein each said at least one projection device is arranged in the respective at least one turret such that the projection device can be installed within and removed from the turret from outside the shell through the lead-through.

2. The apparatus according to claim 1, wherein the at least one light source is arranged outside the shell, in particular in a loading area of the aircraft.

3. The apparatus according to claim 1, further comprising at least one light wave guide arranged along the shell.

4. The apparatus according to claim 1, further comprising at least one further projection device that converts the luminous radiation into projectable luminous radiation, which is adapted to project luminous radiation in arbitrarily definable directions.

5. The apparatus according to claim 1, wherein the aircraft is an airship.

6. The apparatus according to claim 1, wherein the at least one light source is a laser light source.

7. The apparatus according to claim 1, further comprising at least one light wave guide that guides the luminous radiation from the at least one light source to the at least one projection device.

8. The apparatus according to claim 1, wherein the at least one projection device is adapted to project image carrying luminous radiation.

9. The apparatus according to claim 1, wherein the at least one projection device is adapted to project effect light.

10. The apparatus according to claim 1, wherein the at least one projection device is adapted for projecting spatial and/or time variable luminous radiation and/or moving pictures.

11. The apparatus according to claim 8, wherein the image-carrying luminous radiation is composed of several partial images and/or is projected by several projection devices.

12. The apparatus according to claim 1, wherein the at least one light source is housed in the at least one projection device.

13. The apparatus according to claim 1, wherein the at least one projection device is adapted for projecting image carrying luminous radiation that is simultaneous with external events.

14. Aircraft, in particular airship, comprising at least one apparatus according to claim 1.

15. The apparatus according to claim 1, further comprising at least one light wave guide that guides the luminous radiation from the at least one light source to the at least one projection device via the at least one lead-through.

16. Apparatus for displaying luminous radiation on a shell of an aircraft, comprising:
    at least one light source for producing luminous radiation; and
    at least one projection device for converting the luminous radiation into projectable luminous radiation, wherein the at least one projection device is arranged against an inside surface of the shell at a lead-through through the shell, such that the at least one projection device can be installed within and removed from the shell from outside the shell through the lead-through;
    wherein the at least one projection device is arranged in the interior of the shell, so as to project the luminous radiation through the interior on to the shell; and
    wherein the shell is translucent at least in portions, for making the projected luminous radiation visible from the outside;
    whereby the at least one projection device is adapted for projecting image carrying luminous radiation which is simultaneous with external events and the at least one projection device is adapted for projecting at least one of spatial luminous radiation, time-variable luminous radiation, and moving pictures.

17. Apparatus according to claim 16, wherein the at least one light source is arranged outside the shell, in particular in a loading area of the aircraft.

18. Apparatus according to claim 16, further comprising at least one light wave guide arranged along the shell.

19. Apparatus according to claim 16, wherein the aircraft is an airship.

20. Apparatus according to claim 16, wherein the at least one light source is a laser light source.

21. Apparatus according to claim 16, characterized in that further comprising at least one light wave guide that guides the luminous radiation from the at least one light source to the at least one projection device.

22. Apparatus according to claim 16, wherein at least one said projection device is adapted for projecting image carrying luminous radiation.

23. Apparatus according to claim 16, wherein at least one said projection device is adapted for projecting effect light.

24. Apparatus according to claim 16, wherein the image carrying luminous radiation is at least one of composed of several partial images and projected by several projection devices.

25. Apparatus according to claim 16, wherein at least one said light source is housed in at least one projection device.

26. The apparatus according to claim 16, further comprising at least one lead-through arranged at the shell of the aircraft for arranging of the at least one projection device, and at least one light wave guide for guiding the luminous radiation from the at least one light source to the at least one projection device via the at least one lead-through.

27. The apparatus according to claim 16, wherein the at the least one projection device is arranged in the interior of the shell so as to be exchangeably arranged from outside the shell.

28. Aircraft, in particular airship, comprising at least one apparatus according to claim 16.

* * * * *